(12) United States Patent
Kunert et al.

(10) Patent No.: US 11,813,569 B2
(45) Date of Patent: Nov. 14, 2023

(54) EXHAUST MUFFLER, TWO-STROKE ENGINE OR FOUR-STROKE ENGINE HAVING AN EXHAUST MUFFLER, AND CATALYTIC CONVERTER FOR AN EXHAUST MUFFLER

(71) Applicant: Andreas Stihl AG & Co. KG, Waiblingen (DE)

(72) Inventors: Niels Kunert, Ottenbach (DE); Dietmar Widmann, Leutenbach (DE); Martin Christoph Arenz, Stuttgart (DE); Michael Dietenberger, Waiblingen (DE); Johannes Alber, Erdmannhausen (DE); Jan-Eilert Kueper, Erdmannhausen (DE); Marcus Bonifer, Muehiheim (DE); Hans Hildenbrand, Steinau (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 17/707,632

(22) Filed: Mar. 29, 2022

(65) Prior Publication Data
US 2022/0305440 A1 Sep. 29, 2022

(30) Foreign Application Priority Data
Mar. 29, 2021 (EP) .................... 21165546

(51) Int. Cl.
*B01D 53/94* (2006.01)
*F01N 13/00* (2010.01)
*F01N 3/20* (2006.01)

(52) U.S. Cl.
CPC ........... *B01D 53/94* (2013.01); *F01N 3/2046* (2013.01); *F01N 13/017* (2014.06); *F01N 2260/02* (2013.01); *F01N 2590/10* (2013.01)

(58) Field of Classification Search
CPC ..... B01D 53/94; F01N 13/017; F01N 3/2817; F01N 3/2835; F01N 13/0097;
(Continued)

(56) References Cited

U.S. PATENT DOCUMENTS 3,495,950 A * 2/1970 Barber et al. ............. F01N 3/32
60/299
4,220,625 A * 9/1980 Toh ....................... F01N 3/2835
502/527.22
(Continued)

FOREIGN PATENT DOCUMENTS

DE 41 10 285 A1 10/1992
DE 196 43 191 A1 4/1997
(Continued)

*Primary Examiner* — Lessanework Seifu
(74) *Attorney, Agent, or Firm* — Walter Ottesen, P.A.

(57) ABSTRACT

An exhaust muffler has an exhaust inlet, an exhaust outlet, as well as a catalytic converter which, in the flow direction, is disposed between the exhaust inlet and the exhaust outlet. The catalytic converter has at least one throughflow body which includes at least one wire body. At least one first component region of the throughflow body is coated with a catalytically functioning coating. The throughflow body moreover has a second component region which in terms of volume has a smaller quantity of catalytically functioning coating than the first component region.

32 Claims, 5 Drawing Sheets

(58) Field of Classification Search
CPC ............. F01N 2230/04; F01N 2330/10; F01N 2330/12; F01N 3/2885; F01N 3/2803; F01N 3/2853; F01N 3/2046; F01N 2260/02; F01N 2590/06; F01N 2590/10
USPC ........................................................ 422/177
See application file for complete search history.

(56) References Cited

U.S. PATENT DOCUMENTS

| | | | |
|---|---|---|---|
| 5,031,401 A * | 7/1991 | Hinderks | F01N 3/2892 60/323 |
| 5,266,279 A | 11/1993 | Haerle | |
| 5,298,046 A * | 3/1994 | Peisert | F01N 3/0222 55/528 |
| 5,335,492 A * | 8/1994 | Zirkel | F01N 3/2006 422/175 |
| 5,722,237 A | 3/1998 | Iida et al. | |
| 2002/0034460 A1 | 3/2002 | Bruck et al. | |
| 2002/0042344 A1 | 4/2002 | Kondo et al. | |
| 2005/0163677 A1 * | 7/2005 | Galligan | F01N 3/2864 422/177 |
| 2006/0144039 A1 | 7/2006 | Rigaudeau | |
| 2008/0118409 A1 | 5/2008 | Jenkins et al. | |
| 2008/0274020 A1 * | 11/2008 | Matsuoka | F01N 3/022 422/180 |
| 2009/0013673 A1 | 1/2009 | Mukaida | |
| 2013/0183215 A1 | 7/2013 | Zhang et al. | |
| 2013/0309142 A1 | 11/2013 | Gruber | |
| 2019/0329234 A1 | 10/2019 | Hoke et al. | |

FOREIGN PATENT DOCUMENTS

| | | |
|---|---|---|
| DE | 101 47 338 A1 | 5/2002 |
| DE | 10 2006 055 795 A1 | 5/2008 |
| EP | 1 069 286 A2 | 1/2001 |
| EP | 1 581 727 A1 | 10/2005 |
| EP | 1 837 497 B1 | 9/2007 |
| JP | 2009-156158 A | 7/2009 |
| WO | 00/57040 A1 | 9/2000 |
| WO | 2005/030373 A1 | 4/2005 |
| WO | 2008/080696 A1 | 7/2008 |
| WO | 2012/100273 A1 | 8/2012 |
| WO | 2018/100537 A1 | 6/2018 |

\* cited by examiner

EXHAUST MUFFLER, TWO-STROKE ENGINE OR FOUR-STROKE ENGINE HAVING AN EXHAUST MUFFLER, AND CATALYTIC CONVERTER FOR AN EXHAUST MUFFLER

CROSS REFERENCE TO RELATED APPLICATION

This application claims priority of European patent application no. 21165546.9, filed Mar. 29, 2021, the entire content of which is incorporated herein by reference.

TECHNICAL FIELD

The disclosure relates to an exhaust muffler, to a two-stroke engine or four-stroke engine having an exhaust muffler, as well as to a catalytic converter for an exhaust muffler.

BACKGROUND

An exhaust muffler which has a throughflow body of knitted wire which is coated with a catalytic material is known from JP 2009-156158 A.

Handheld work apparatuses driven by an internal combustion engine such as, for example, chain saws, cut-off machines, trimmers, blowers, lawnmowers or the like are targeted by ever-increasing statutory requirements in terms of the composition of exhaust gases. In order to meet these requirements, it is known for catalytic converters to be used for exhaust gas aftertreatment also in small engines of this type. The parameters for catalytic converters of this type in handheld work apparatuses differ from the parameters in the automotive sector, for example, in a variety of aspects. By virtue of the limited installation space available, exhaust mufflers in handheld work apparatuses of this type have to be configured so as to be comparatively small. At the same time, any contact between the operator and hot parts of the work apparatus has to be avoided. Therefore, there are strict requirements also with a view to the exhaust temperatures. Handheld work apparatuses which are driven by an internal combustion engine usually do not have a dedicated power supply so that electric pre-heating of the catalytic converter is not an option. Also, the available sensors are typically limited. Lambda probes or the like are usually nonexistent. The internal combustion engines used are often mixture-lubricated engines so that the exhaust gas contains a significant proportion of particles that are to be minimized in the exhaust muffler. In that the fuel in the case of mixture-lubricated engines is at least in part supplied into the crankcase of the internal combustion engine, it is impossible to meter fuel accurately for each cycle. The composition of the exhaust gas in small engines of this type is therefore significantly more variable than, for example, in the automotive sector where accurate control of the fuel quantity injected directly into the combustion chamber takes place for each cycle.

Therefore, in terms of temperature and weight as well as in terms of variable exhaust gas compositions, exhaust mufflers for handheld work apparatuses of this type have to meet different requirements than exhaust mufflers such as used in the automotive sector or for diesel engines or for separately lubricated four-stroke engines.

SUMMARY

An object of the disclosure is to provide an exhaust muffler of the generic type which is of a simple and robust construction and can be used in particular for mixture-lubricated internal combustion engines. Further objects of the disclosure lie in specifying a two-stroke engine or a mixture-lubricated four-stroke engine, and a catalytic converter for an exhaust muffler.

It is provided that the exhaust muffler includes a catalytic converter, the throughflow body of the latter including at least one wire body. At least one first component region of the throughflow body is coated with a catalytically functioning coating. The throughflow body has at least one second component region which in terms of volume has a smaller quantity of catalytically functioning coating than the first component region. It can be provided here that the second component region does not have any catalytically functioning coating. However, it can also be provided that the first component region and the second component region are coated with dissimilar quantities of catalytically functioning coating.

In that the throughflow body includes at least one wire body, the throughflow body can be of a simple and stable construction. A wire body is presently understood to be a dimensionally stable body which is formed from at least one wire of metal. A wire here is a thin, elongate, flexural metal part. The wire can preferably have a round cross section. An angular cross section may also be advantageous. In the context of the usual production tolerances, the cross section of the wire along the length thereof is consistent. The wire can preferably be produced by drawing.

The volume of the first component region is advantageously 5% to 90%, in particular 5% to 80%, of the total volume of the throughflow body. The volume of the first component region is particularly advantageously at most 50%, in particular at most 30%, of the total volume of the throughflow body. A volume of the first component region of 10% to 20% of the total volume of the throughflow body has proven to be particularly advantageous.

The volume of the second component region is advantageously 10% to 95%, in particular 20% to 95%, of the total volume of the throughflow body. The volume of the second component region is particularly advantageously at least 50%, in particular at least 70%, of the total volume of the throughflow body. A volume of the second component region of 80% to 90% of the total volume of the throughflow body has proven to be particularly advantageous.

The total volume of the throughflow body can be, for example, from 10 cm$^3$ to 200 cm$^3$, in particular from 20 cm$^3$ to 100 cm$^3$.

The diameter of the wire of the wire body or, in the case of a non-round cross section, the largest extent of the wire in the cross section is advantageously from 0.1 mm to 2 mm, in particular from 0.2 mm to 1 mm. As a result, the wire is sufficiently dimensionally stable in operation but also so elastic that external forces acting on the wire body in operation do not lead to permanent deformations. A diameter from 0.3 mm to 1 mm is considered to be particularly advantageous. The diameter of the wire is particularly preferably at most 0.5 mm.

In that the throughflow body has at least two component regions having dissimilar quantities of catalytically functioning coating in terms of volume, the catalytic conversion of the exhaust gas takes place predominantly or completely in the first component region. As a result, rapid and intense heating takes place in the first component region. The second component region of the throughflow body can preferably serve predominantly for reducing particles. Lubricating oil which is evaporated by the catalytic converter is contained in the form of drops in exhaust gases of mixture-lubricated internal combustion engines. A sufficiently high temperature of the catalytic converter is required to this end. Moreover, a sufficiently long dwell time of the oil droplets in the catalytic converter is necessary. The second component region is preferably rapidly heated by the first component region. The particle-reducing effect of the second component region is improved as a result. Oil droplets are evaporated as soon as the temperatures required to this end have been reached. In lubricating oils usually used nowadays the evaporation temperature can be in the magnitude of 600° C. to 700° C., for example. Moreover, the second component region serves for thermally insulating the first component region. Therefore, the second component region is also advantageous for catalytic converters in which the particle reduction is not a priority. The first component region which is coated with the catalytically functioning coating, in particular with precious metal, preferably serves predominantly for converting hydrocarbons and/or nitrogen oxides.

The second component region advantageously does not have any catalytically functioning coating. A catalytically functioning coating in the present context relates to a coating that acts as a catalytic converter, thus lowers the activation energy for the chemical conversion of the exhaust gases and increases the speed of the reaction as a result. A washcoat in the present context is not considered to be a catalytic coating. A washcoat is considered to be a coating that enlarges the surface without lowering the activation energy for the chemical conversion. The second component region advantageously does not have any catalytically functioning coating but may have a washcoat.

A simple construction of the throughflow body results when the throughflow body is assembled from a plurality of dimensionally stable individual bodies. At least one of the individual bodies here is a wire body. Each of the individual bodies here in all regions can preferably have the same coating or no coating. As a result, the individual bodies can be coated in their entirety. Masking different regions of the individual bodies during the coating procedure can be dispensed with. The coating procedure is simplified as a result. The production is likewise simplified in that each individual body is inherently dimensionally stable. The throughflow body can preferably be composed completely of dimensionally stable individual bodies. The number of individual bodies of the throughflow body is advantageously at most 10, particularly preferably at most 5.

Each individual body is advantageously only part of a single component region. Component regions having dissimilar quantities of catalytically functioning coating are formed by dissimilar individual bodies, in particular dissimilar wire bodies.

At least 50% of the second end face is advantageously formed by the second component region. In an embodiment, the second end face is formed completely by the second component region. As a result, the temperature of the exhaust gases exiting the catalytic converter can be lowered. At the same time, the dwell time of the exhaust gases in the catalytic converter can be prolonged.

The first component region in a cross section through the first component region perpendicular to the flow direction preferably extends across at least 30%, in particular at least 50%, of the area of the throughflow body. It is ensured as a result that a sufficiently large proportion of the exhaust gas flows directly through the first component region and hydrocarbons and/or nitrogen oxides that are contained in this proportion of the exhaust gas are catalytically converted. In a variant of the embodiment it is provided that the first component region, in at least one cross section through the first component region perpendicular to the flow direction, extends across at most 80%, in particular at most 70%, of the area of the throughflow body in this cross section. Therefore, part of the exhaust gas in each cross section flows through the second component region. Excessive heating of the exhaust muffler and of the exhaust gases can be avoided as a result.

In an alternative embodiment, it is provided that the thickness of the first component region measured in the flow direction is comparatively minor in comparison to the thickness of the second component region. Excessive heating of the exhaust muffler in operation can also be prevented in a simple manner as a result. The comparatively minor thickness of the first component region and the extent of the first component region across only part of the cross-sectional area of the throughflow body can be provided as alternatives or in combination. Further or other measures for preventing excessive heating of the exhaust muffler may also be provided.

In an embodiment, the first component region is formed by at least one first wire body, and the second component region is formed by at least one second wire body. A simple construction of the exhaust muffler can be achieved as a result.

According to an embodiment, the second component region is formed by exactly two second wire bodies. However, it can also be provided that the second component region is constructed using a single second wire body or a larger number of second wire bodies. In an embodiment, the first component region is formed by exactly one first wire body. However, a larger number of first wire bodies that form the first component region may also be provided.

In an embodiment, in which the second component region is formed by at least two second wire bodies, it can preferably be provided that at least one of the second wire bodies has a depression for receiving at least one first wire body. In an embodiment, the throughflow body is assembled from the at least two second wire bodies and the at least one first wire body. The depression for receiving the at least one first wire body causes the first wire body to be fixed in the second wire body such that a simple construction results. The throughflow body can preferably be assembled from a plurality of wire bodies, the shape of the latter being chosen such that the wire bodies are mutually pre-fixed upon assembling.

In an embodiment, the wire bodies of the throughflow body are disposed in a catalytic converter housing of the catalytic converter, in particular press-fitted into the latter or fixedly welded therein. Additional fastening means may be present but are not mandatory.

The throughflow body advantageously has a peripheral surface which extends from the first end face to the second end face. The peripheral surface of the throughflow body can preferably be the face in contact with the catalytic converter housing. The peripheral surface can advantageously be formed by the second component region to a degree of at least 50%, in particular to a degree of at least 80%, particularly preferably formed completely by the second component region. In that a large part of the peripheral surface of the throughflow body is formed by the second component region, only a minor quantity of catalytically functioning coating, if any, is lost when press-fitting the throughflow body into the catalytic converter housing.

In an embodiment, the second component region completely surrounds the first component region. The second component region here advantageously forms the first and the second end face and the peripheral surface of the throughflow body, in particular if the throughflow body has no further component regions. As a result, the first component region is protected by the second component region against mechanical stresses, in particular in the production of the exhaust muffler, or in operation, as well as against particles or additives in the exhaust gas, such as oil, for example.

A simple, alternative, advantageous construction results when the first component region and the second component region in at least one cross section extend in each case across the entire cross-sectional area of the exhaust muffler measured perpendicularly to the flow direction. As a result, the individual portions of the throughflow body are disposed successively in the flow direction. The first component region and/or the second component region here can be divided into a plurality of portions such that this results in a disk-type construction of the catalytic converter. In an embodiment, each component region has a consistent thickness measured perpendicularly to the flow direction.

At least 50%, in particular at least 80%, of the first end face is advantageously formed by the second component region. In an embodiment, the first end face is formed completely by the second component region. As a result, exhaust gas, and in particular oil and particles mixed with the exhaust gas, does not come into direct contact with the first component region but flows through the second component region first. At least part of the oil contained in the exhaust gas can be retained in the second component region as a result, such that excessive loading of the catalytic coating is avoided. The service life of the catalytic converter can be extended as a result. In an embodiment, the second component region forms the first end face as well as the second end face. Lower temperatures of the exhaust gas exiting the catalytic converter can be achieved in that the second component region forms the second end face.

In an embodiment, it is provided that the first end face is formed completely by the first component region. A compact construction mode of the exhaust muffler can be achieved as a result. The first end face being formed completely by the first component region is particularly advantageous if the first component region is formed by a coarse-mesh metal body through which part of the exhaust gas can flow without any contact with the catalytic coating. Premature loading of the exhaust muffler, for example with oil or particles, in the region of the catalytic coating can be prevented also by this configuration of the first component region.

The greatest thickness of the first component region measured in the flow direction can preferably be smaller than the greatest thickness of the second component region measured in the flow direction. The greatest thickness of the first component region measured in the flow direction can advantageously be at most 30% of the greatest thickness of the second component region measured in the flow direction. The greatest thickness of the first component region measured in the flow direction is preferably at most 20%, in particular at most 10%, of the greatest thickness of the second component region measured in the flow direction. If the component region is formed by a plurality of portions that are mutually spaced apart in the flow direction, the greatest thickness of a component region is the sum of the individual thicknesses of the individual portions of the component region. The greatest thickness of a component region here is the largest extent of this component region measured in the flow direction. The thickness of the first component region and/or the thickness of the second component region are/is advantageously consistent. Accordingly, the first component region and/or the second component region have the same thickness in all regions.

An alternative embodiment of a very simple construction results when the first component region is configured so as to be cylindrical, and the second component region is configured as a hollow cylinder, and the first component region is disposed in the second component region. Preferably, the throughflow body can be formed from exactly two individual bodies, specifically an individual body forming the first component region and an individual body forming the second component region.

In an embodiment, the first component region extends across the entire length of the throughflow body measured in the flow direction. A comparatively long flow path of the exhaust gas in the first component region can be achieved as a result. This enables a positive catalytic conversion of the exhaust gas.

A simple construction results if at least one wire body is a woven metal mesh. The woven metal mesh can preferably be a single-layer woven fabric made from warp threads and weft threads. The wire diameter of the woven metal mesh can advantageously be comparatively large such that this results in comparatively large intermediate spaces between adjacent wires of the woven metal mesh. As a result, part of the exhaust gas can flow through the openings of the woven metal mesh without contacting the woven metal mesh, excessive heating of the woven metal mesh thus being avoided.

At least one wire body is advantageously formed by a compression molded metal wire. A wire body of this type is easy to produce and achieves a very positive particle reduction if the wire is randomly disposed. The compression molded metal wire is particularly advantageously a compression molded knitted metal fabric. However, another structure of the compression molded metal wire may also be advantageous.

In an embodiment, the throughflow body is configured by at least two individual bodies of dissimilar structures. All individual bodies of the throughflow body are preferably inherently dimensionally stable. The exhaust muffler thus differs fundamentally from throughflow bodies that are constructed using a multiplicity of random individual fibers or the like. A simple production capability and a simple construction of the catalytic converter is achieved by the comparatively small number of individual, dimensionally stable bodies that form the throughflow body. All individual bodies from which the throughflow body is constructed can advantageously be composed of metal. In an embodiment, at least two wire bodies of dissimilar structures are configured. For example, one wire body can be a woven metal mesh, and one wire body can be a compression molded knitted metal fabric. However, it can also be provided that the throughflow body is composed of at least one wire body and of at least one individual body that is not constructed from wire. The further body not configured from wire can be a metal lattice, for example.

In a variant of embodiment the throughflow body is formed exclusively by first wire bodies and second wire bodies. This results in a simple construction. In an alternative embodiment, the throughflow body includes at least one metal lattice. The at least one metal lattice here forms in particular the first component region. However, it can also be provided that one metal lattice or a plurality of metal lattices forms/form the second component region.

In order to effectively minimize the particles contained in the exhaust gas, the second component region has to achieve a sufficiently high temperature during operation. The heating of the second component region via the catalytically coated first component region is provided for this purpose according to the disclosure. In order to achieve very positive and uniform heating, it is advantageously provided that the second component region includes a plurality of portions configured so as to be mutually separate, the first component region extending therebetween, wherein the second component regions are in particular connected to one another by way of at least one heat conducting element. The at least one heat conducting element extends through portions of the second component region and heats the latter as a result. This results in a simple construction and a complete conversion capability of the catalytic converter already after a short operating period. The second component regions by way of the at least one heat conducting element are advantageously connected directly and in a rectilinear manner to one another. The at least one heat conducting element advantageously has a higher thermal conductivity than the second component region. The at least one heat conducting element can preferably be made of a material which has a higher thermal conductivity than the material forming the second component region. A higher thermal conductivity can also be achieved, for example, by another configuration, for example by a larger material cross section.

The throughflow body advantageously has exactly two component regions which differ from one another in terms of the quantity of catalytically functioning coating. All portions of the first component region in terms of volume advantageously have the same quantity of catalytically functioning coating. In particular, all portions of the second component region in terms of volume have the same quantity of catalytically functioning coating. The second component region can particularly preferably have no catalytically functioning coating.

The second component region can preferably have a catalytic coating of less than 1 mg/cm$^3$. In an embodiment the second component region is coated with a washcoat. In particular, the second component region here is coated only with a washcoat and does not have any catalytically functioning coating. Alternatively, less catalytic coating in terms of volume can be provided than in the first component region. In an embodiment, the second component region is uncoated. Accordingly, the second component region has neither a washcoat nor a catalytically functioning coating.

A washcoat is understood to be a coating for enlarging the surface. For example, the washcoat can be composed of aluminum oxide and/or cerium oxide, or contain these materials. Alternatively or additionally, the washcoat can be composed of further materials. In the present context, the washcoat is not understood to be a catalytically functioning coating. The catalytically functioning coating advantageously contains a precious metal.

An advantageous embodiment results if the throughflow body is formed by at least one wound mat. The throughflow body can be produced in a simple manner by winding a mat.

The first component region in the direction transverse to the flow direction through the throughflow body is advantageously at least partially surrounded by the second component region. The first component region in the direction transverse to the flow direction through the throughflow body is particularly advantageously completely surrounded by the second component region.

The first component region is advantageously formed by at least one first mat, and the second component region is formed by at least one second mat. The at least one first mat and the at least one second mat here can in each case be individually produced and be coated with a washcoat and/or a catalytically functioning coating as one entity. The production is simplified as a result. In an alternative embodiment, the exhaust muffler is formed by at least one mat which forms the first component region, or part of the first component region, as well as the second component region, or part of the second component region, and in different portions of the length in terms of volume is coated with dissimilar quantities of catalytically functioning coating.

In an embodiment, the at least one first mat and the at least one second mat have dissimilar thicknesses. Alternatively or additionally, it can be provided that the at least one first mat and the at least one second mat have dissimilar widths measured in the flow direction. It can be achieved as a result that an end face of the catalytic converter is formed by only one of the mats. In an alternative embodiment, it can be provided that the first mat and the second mat are wound so as to have a mutual offset in the flow direction. It can also be achieved as a result that only one of the component regions extends on an end face of the catalytic converter.

The throughflow body produced from at least one wound mat is advantageously dimensionally stable. To this end it can be provided that the throughflow body after winding is compression molded. At least one mat is advantageously formed from metal wire. Alternatively or additionally, it can be provided that at least one mat is a knitted fabric or a warp and/or weft knitted fabric. At least one component region can advantageously be composed of metal wire. In particular, both component regions are composed of metal wire.

It can be provided that a first mat is wound first, and a second mat is subsequently wound about the first mat. As a result, the first mat forms an inner first component region and the second mat forms a second component region which on the external side of the first component region extends above the first component region. As a result, the first component region can be configured as a compact core of the throughflow body.

In an alternative embodiment, it is provided that the first mat and the second mat are placed on top of one another prior to being wound. Created as a result is a throughflow body which in the cross section has a plurality of successive layers of the first component region and of the second component region. At least two layers of each component region are advantageously provided in at least one cross section here. The mats here can have dissimilar thicknesses and/or dissimilar widths and/or be wound so as to be mutually offset in the flow direction. Particularly preferably, the first mat and the second mat can bear directly on one another prior to being wound. The mats are advantageously in mutual contact across the entire length thereof and are wound without any intervening tier of further tiers. As a result, exhaust gas can flow back and forth between the tiers of the component regions without impediment.

In an embodiment, a first, upstream end face of the throughflow body is formed completely by the second component region. Alternatively or additionally, it is advantageously provided that a second, downstream end face of the throughflow body is formed completely by the second component region. It may also be advantageous for at least one end face of the throughflow body to be formed completely by the first component region.

The catalytic converter has in particular a catalytic converter housing. The throughflow body can preferably be disposed in the catalytic converter housing. In an embodiment, the throughflow body is press-fitted into the catalytic converter housing. A simple construction and a simple production capability without additional fastening means are achieved as a result. In an embodiment, the throughflow body is pressed into the catalytic converter housing by way of a few millimeters of overlap. The press-fitting of the throughflow body is particularly advantageous when the throughflow body is at least partially, in particular completely, produced by compression molded metal wire. The throughflow body in this instance has sufficient elasticity and after the press-fitting procedure is held in a stable manner in the catalytic converter housing.

The catalytic converter housing advantageously has at least one inlet opening and at least one outlet opening. The at least one inlet opening and the at least one outlet opening are advantageously disposed so as to be at least partially mutually offset. In an embodiment, the at least one inlet opening and the at least one outlet opening do not mutually overlap. The overlap of the inlet opening and the outlet opening here relates to the inflow direction of the exhaust gas through the respective inlet opening, thus to a direction perpendicular to the area of the at least one inlet opening. In that the at least one inlet opening and the at least one outlet opening are disposed so as to be at least partially mutually offset, in particular do not mutually overlap, it is ensured that the exhaust gas is deflected within the catalytic converter housing. As a result, the flow path of the exhaust gas in the catalytic converter housing can be extended, and thus the conversion improved, in a simple manner.

In an embodiment, the total flow cross section of all outlet openings is smaller than the total flow cross section of all inlet openings. The backpressure in the catalytic converter housing, and thus the dwell time of the exhaust gas within the catalytic converter housing, is increased as a result.

The exhaust muffler can in particular be the exhaust muffler of a two-stroke engine or of a mixture-lubricated four-stroke engine. In mixture-lubricated engines of this type, oil can be contained in the exhaust gas. The specified construction of an exhaust muffler having a catalytic converter is particularly advantageous for internal combustion engines of this type. The use of the exhaust muffler for separately lubricated internal combustion engines, in particular for separately lubricated four-stroke engines, is also possible. The exhaust muffler is particularly advantageous for a handheld work apparatus such as a chain saw, a cut-off machine, a trimmer, a blower, a lawnmower, a spray apparatus, or the like.

BRIEF DESCRIPTION OF THE DRAWINGS

The invention will now be described with reference to the drawings wherein.

DESCRIPTION OF THE PREFERRED EMBODIMENTS

Figure 1:
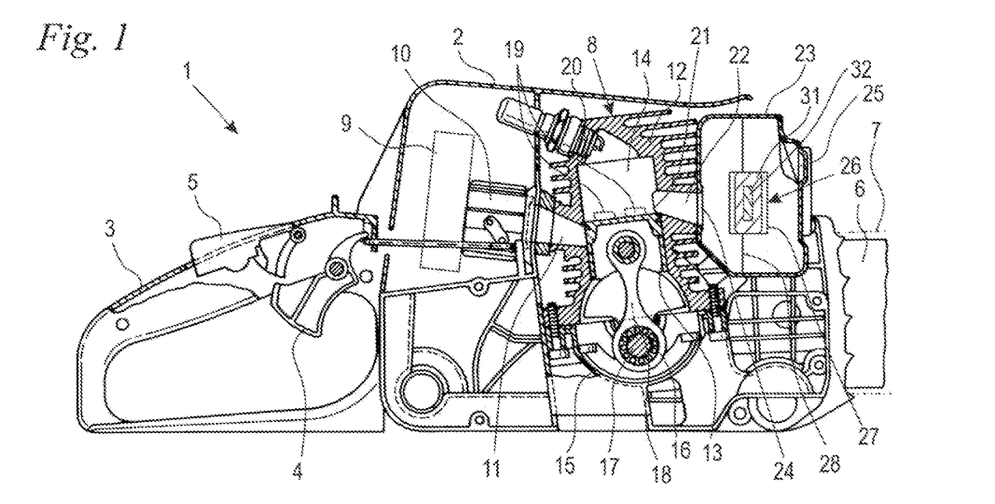
FIG. 1 shows a schematic sectional illustration of a handheld work apparatus.

FIG. 1 as an embodiment for a handheld work apparatus shows a chain saw 1. The work apparatus is in particular a portable work apparatus. The handheld work apparatus can also be, for example, a cut-off machine, a blower, a trimmer, a spray apparatus, a lawnmower, or the like. The chain saw 1 has a housing 2 on which a rear handle 3 is disposed. Operating elements, in the embodiment a throttle lever 4 as well as a throttle lever lock 5, are disposed on the rear handle 3. The chain saw 1 has a guide bar 6 on which a saw chain 7 is disposed in an encircling manner. The saw chain 7 is driven by an internal combustion engine, in the embodiment a mixture-lubricated internal combustion engine. The internal combustion engine in the embodiment is disposed in the housing 2. A two-stroke engine 8 is illustrated as an internal combustion engine in FIG. 1. The two-stroke engine 8 takes in combustion air by way of an air filter 9. The air filter 9 is connected to a crankcase 15 of the two-stroke engine 8 by way of an intake channel 11. Fuel from a fuel supply unit 10, in the embodiment a carburetor, is supplied into the intake channel 11. The fuel supply unit 10 can also be formed by one fuel valve or a plurality of fuel valves instead of the carburetor. The supply of fuel can also take place directly into the crankcase 15.

The two-stroke engine 8 has a cylinder 12 in which a piston 13 is mounted in a reciprocating manner. The piston 13 delimits a combustion chamber 14 configured in the cylinder 12. The piston 13 by way of a connecting rod 16 drives a crankshaft 17 which is mounted in the crankcase 15 so as to be rotatable about a rotational axis 18. The interior of the crankcase 15 in the region of the bottom dead center of the piston 13 is fluidically connected to the combustion chamber 14 by way of a plurality of transfer channels 19. A spark plug 20 protrudes into the combustion chamber 14. A discharge opening 21 leads out of the combustion chamber 3. The discharge opening 21 by way of a discharge channel 22 is connected to the exhaust inlet 24 of an exhaust muffler 23. An exhaust outlet 25 leads out of the exhaust muffler 23. The exhaust gases escape into the environment by way of the exhaust outlet 25.

During the operation of the two-stroke engine 8 combustion air and fuel are suctioned into the interior of the crankcase 15 during the upward stroke of the piston 13. During the subsequent downward stroke of the piston 13 the fuel/air mixture is compressed in the crankcase 15. The connection between the transfer channels 19 and the combustion chamber 14 is controlled by the piston 13. As soon as the transfer channels 19 open toward the combustion chamber 14, fuel/air mixture from the crankcase 15 flows into the combustion chamber 14. During the subsequent upward stroke of the piston 13 the fuel/air mixture is compressed in the combustion chamber 14 and in the region of the top dead center of the piston 13 ignited by the spark plug 20. The subsequent combustion accelerates the piston 13 in the direction toward the crankcase 15. The discharge opening 21 is controlled by the piston 13. As soon as the discharge opening 21 is opened by the piston 13, exhaust gases flow out of the combustion chamber 14, and fresh mixture flows into the combustion chamber 14 by way of the transfer channels 19.

The two-stroke engine 8 can also be a two-stroke engine operating with stratified scavenging whereby air which purges exhaust gases from the combustion chamber 14 prior to fresh fuel/air mixture flowing out of the crankcase 15 is pre-supplied into the transfer channels 19.

The rotating parts in the crankcase 15 are lubricated by the fuel/air mixture which is pre-compressed in the interior of the crankcase 15. To this end, two-stroke oil is added to the fuel. During combustion, the two-stroke oil leads to the formation of soot and, depending on the sequence of the combustion, can also migrate from the combustion chamber 14 into the exhaust muffler 23 without being combusted.

Figure 2:
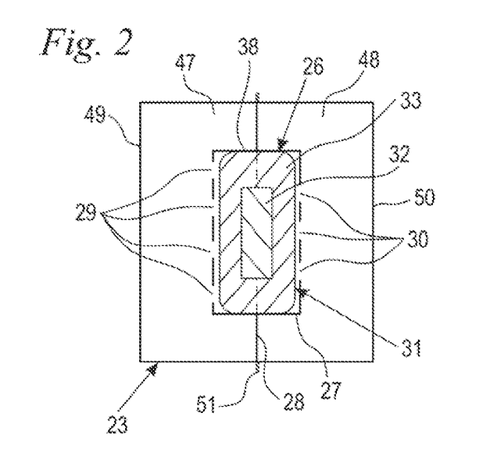
FIG. 2 shows a schematic sectional illustration through the exhaust muffler of the handheld work apparatus from FIG. 1.

The exhaust muffler 23 can be of any customary configuration. The exhaust muffler 23 can preferably be made of a plurality of metal shells which are connected to one another on an encircling edge 51 (FIG. 2). The exhaust muffler 23 has a catalytic converter 26. In the embodiment, the catalytic converter 26 is held in a partition wall 28 of the exhaust muffler 23. In the embodiment, the entire exhaust gas flows through the catalytic converter 26. The catalytic converter 26 has a catalytic converter housing 27. A throughflow body 31 of the catalytic converter 26 is disposed in the catalytic converter housing 27, the construction of the throughflow body 31 being explained hereinafter.

FIG. 2 shows the exhaust muffler 23 in detail. The exhaust muffler 23 in the embodiment includes a first component shell 49 and a second component shell 50 which are connected to one another on the encircling edge 51. The edge 51 can preferably be beaded. In the embodiment, the partition wall 28 is also held on the edge 51. The component shells 49 and 50 can be for example deep-drawn sheet-metal parts. The exhaust muffler 23 can include further component shells. A first muffler chamber 47 is configured in the first component shell 49, and a second muffler chamber 48 is configured in the second component shell 50. The two muffler chambers 47 and 48 are separated by the partition wall 28.

The catalytic converter 26 is disposed in the flow path between the two muffler chambers 47 and 48. The catalytic converter housing 27 in the embodiment has a multiplicity of inlet openings 29 by way of which exhaust gas enters the interior of the catalytic converter housing 27. The catalytic converter housing 27 has outlet openings 30 by way of which the exhaust gas exits the catalytic converter housing 27. In the embodiment, the exhaust gas from the muffler chamber 47 enters the catalytic converter housing 27 by way of the inlet openings 29, and exits to the second muffler chamber 48 by way of the outlet openings 30. Another arrangement of the catalytic converter 26 in the flow path may also be provided.

A throughflow body 31 is disposed in the catalytic converter housing 27. The throughflow body 31 has a peripheral surface 38 which is in contact with the catalytic converter housing 27. Advantageously, the entire peripheral surface 38 is in contact with the catalytic converter housing 27.

The entire exhaust gas advantageously flows through the throughflow body 31. The throughflow body 31 has a first component region 32 and a second component region 33. The component regions 32 and 33 differ in the quantity of catalytically functioning coating in terms of volume of the respective component region 32, 33. The first component region 32 in terms of volume has a larger quantity of catalytically functioning coating than the second component region 33. The thickness of the catalytically functioning coating in the first component region 32 is advantageously larger than in the second component region 33. In a variant of embodiment, the second component region 33 does not have any catalytically functioning coating. The second component region 33 can have a washcoat for enlarging the surface. It can also be provided that the second component region 33 does not have any coating, thus neither a washcoat nor a catalytically functioning coating.

Figure 3:
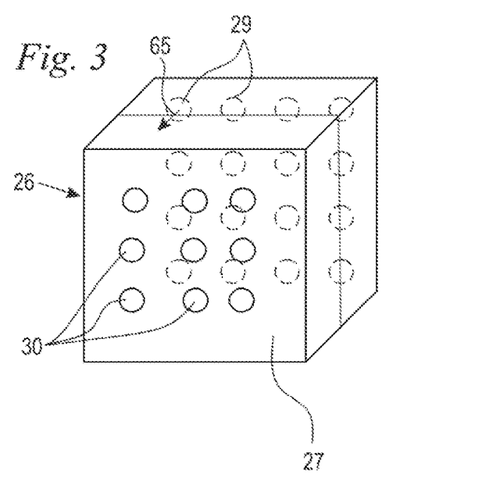
FIG. 3 shows a perspective, schematic illustration of the catalytic converter housing of the exhaust muffler.

FIG. 3 shows the configuration and the disposal of the inlet openings 29 and the outlet openings 30. As is shown in FIG. 3, the number of outlet openings 30 is less than the number of inlet openings 29. In the embodiment, inlet openings 29 and outlet openings 30 each have the same cross section. As a result, the available flow cross section of all inlet openings 29 is larger than the available flow cross section of all outlet openings 30. The inlet openings 29 are disposed so as to be offset from the outlet openings 30. When viewed in the inflow direction 65, the inlet openings 29 do not overlap the outlet openings 30. As a result, the exhaust gas is diverted within the catalytic converter housing 27. A partial overlap between the inlet openings 29 and the outlet openings 30 in the inflow direction 65 may be advantageous.

The inflow direction 65 is the direction by way of which the exhaust gas flows in through the respective inlet opening 29. The inflow direction 65 is directed so as to be perpendicular to the area of the respective inlet opening 29. Alternatively, it can also be provided that there are identical numbers of inlet openings 29 and of outlet openings 30 but the flow cross sections are dissimilar such that the total flow cross section of all outlet openings is smaller than the total flow cross section of all inlet openings. A dissimilar number of inlet openings and outlet openings in combination with dissimilar flow cross sections of the inlet openings and outlet openings may also be advantageous.

Figure 4:
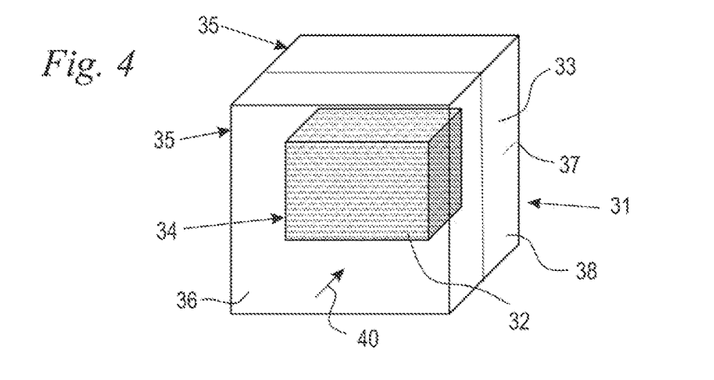
FIG. 4 shows a perspective, schematic illustration of the throughflow body of the catalytic converter.

FIG. 4 shows the configuration of the throughflow body 31 in detail. In the embodiment the throughflow body 31 is formed by three wire bodies 34, 35. Provided is a first wire body 34 which is provided with a catalytically functioning coating. The first wire body 34 forms the first component region 32. The second component region 33 is formed by two wire bodies 35. In the embodiment, the two second wire bodies 35 are identical. One of the wire bodies 35 forms a first end face 36 of the throughflow body 31. The other wire body 35 forms an opposite second end face 37. In terms of the flow direction 40 of the exhaust gases, the end face 36 is upstream of the throughflow body 31. The first end face 36 forms the incident flow side of the throughflow body 31. The exhaust gases exit the throughflow body 31 by way of the second end face 37. The second end face 37 forms the outflow side of the throughflow body 31.

The diameter of the wire of the wire bodies 34, 35 or, in the case of a non-round cross section, the largest extent of the wire in the cross section is advantageously from 0.1 mm to 2 mm, in particular from 0.2 mm to 1 mm, preferably from 0.3 mm to 1 mm. The largest extent of the wire in the cross section is particularly preferably at most 0.5 mm. A wire diameter of these orders of magnitude is preferable for the wire bodies.

Both end faces 36 and 37 in the embodiment are formed completely by the second component region 33. The throughflow body 31 has the peripheral surface 38. The peripheral surface 38 extends from the first end face 36 to the second end face 37. The peripheral surface 38 is advantageously in contact with the catalytic converter housing 27. The throughflow body 31 can preferably be held in the catalytic converter housing 27 by way of the press-fit of the peripheral surface 38 in relation to the catalytic converter housing 27. The peripheral surface 38 in the embodiment is formed completely by the second component region 33. The peripheral surface 38 in the embodiment to the extent of 50% is in each case formed by the two wire bodies 35. In a cross section through the first component region 32 perpendicular to the flow direction 40, the first component region 32 advantageously extends across at least 30%, in particular at least 50%, of the area of the throughflow body 31. The first component region 32, in at least one cross section through the first component region 32 perpendicular to the flow direction 40, advantageously extends across at most 806%, in particular at most 70%, of the area of the throughflow body 31 in this cross section.

Figure 5:
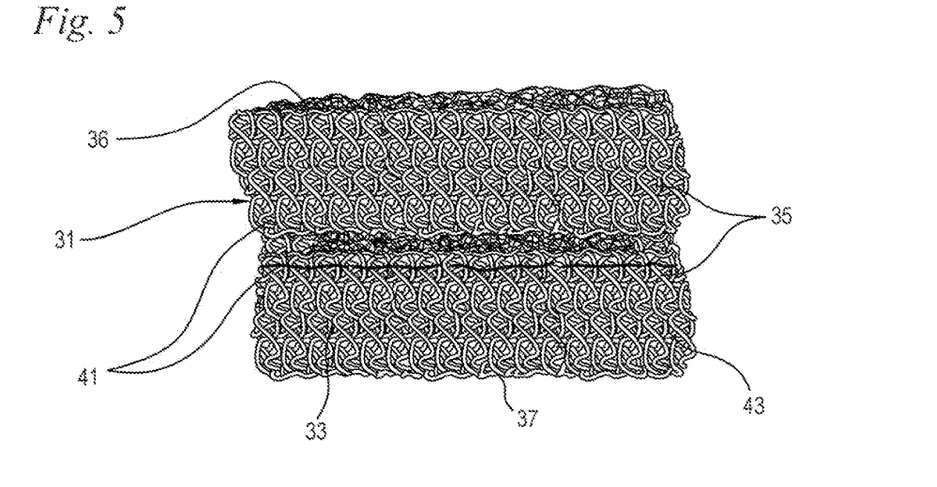
FIG. 5 shows a perspective illustration of the throughflow body.
Figure 6:
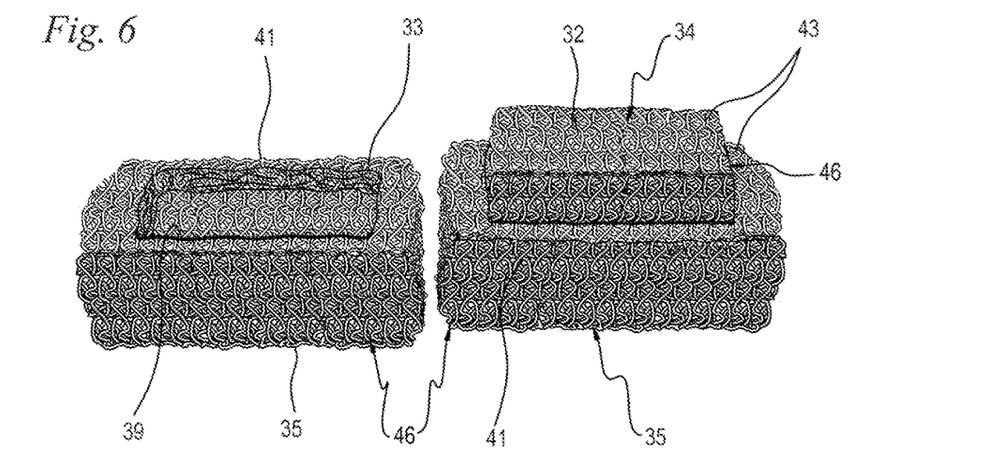
FIG. 6 shows a perspective illustration of the wire bodies of the throughflow body.

FIG. 5 shows the construction of the throughflow body 31 from metal wire 43 in detail. The metal wire 43 forms the two second wire bodies 35 and, as is shown in FIG. 6, the first wire body 34. The two wire bodies 35 form the two end faces 36 and 37 of the throughflow body 31, as is illustrated in FIG. 5. The wire bodies 35 are constructed from compression molded metal wire. In an embodiment, each wire body 35 is formed by a single wire. The wire bodies 35 can be composed of a compression molded knitted metal fabric.

As is shown in FIG. 6, both wire bodies 35 each have one depression 39. The depressions 39 in the embodiment are approximately rectangular in the cross section. The first wire body 34 in the assembled state of the throughflow body 31 shown in FIG. 5 protrudes into the depressions 39 of both wire bodies 35. The cross section of the depressions 39 corresponds approximately to the cross section of the first wire body 34 so that the wire body 34 largely, in particular completely, fills the depression 39. The compression molded metal wire 46 from which the wire bodies 34 and 35 are formed can be readily seen in FIG. 6. As is also shown in FIG. 6, an edge 41 of the wire bodies 35 that surrounds the first wire body 34 on the circumference thereof extends in each case about the depressions 39. As is shown in FIG. 5, the edges 41 protrude toward one another such that the first wire body 34 is largely, in particular completely, surrounded by the two second wire bodies 35 that form the second component region 33.

Figure 7:
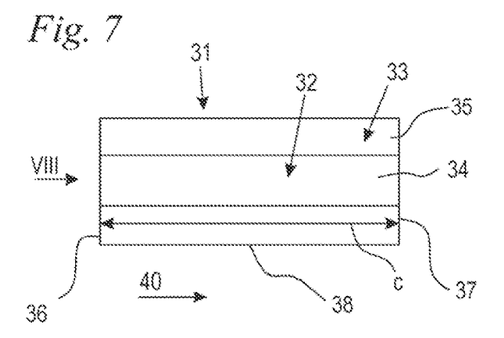
FIG. 7 shows a schematic sectional illustration of an alternative embodiment of a throughflow body.
Figure 8:
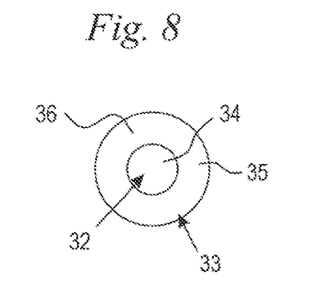
FIG. 8 shows a schematic illustration of the throughflow body from FIG. 7 when viewed in the direction of the arrow VIII in FIG. 7.

FIGS. 7 and 8 show a further embodiment of a throughflow body 31. The throughflow body 31 has two component regions 32 and 33 which in terms of volume are coated with dissimilar quantities of catalytically functioning material. Both component regions 32 and 33 can advantageously be composed of wire bodies, in particular of compression molded metal wire. Each component region 32, 33 can preferably be formed by exactly one wire body 34 or 35, respectively. However, it can also be provided that one or both component regions 32, 33 is/are formed by a plurality of wire bodies 34, 35. In the embodiment, both component regions 32 and 33 extend continuously from the first end face 36 to the second end face 37. Both component regions 32 and 33 have a length c which is measured in the flow direction and corresponds to the spacing between the first end face 36 and the second end face 37.

In a cross section through the first component region 32 perpendicular to the flow direction 40, the first component region 32 advantageously extends across at least 30%, in particular at least 50%, of the area of the throughflow body 31. The first component region 32, in at least one cross section through the first component region 32 perpendicular to the flow direction 40, advantageously extends across at most 80%, in particular at most 70%, of the area of the throughflow body 31 in this cross section.

The second component region 33 forms the peripheral surface 38 of the throughflow body 31. The peripheral surface 38 is formed completely by the second component region 33. As is also shown in FIG. 8, the first component region 32 in the embodiment is configured so as to be cylindrical, and the second component region 33 is configured as a hollow cylinder. The first component region 32 is disposed in the interior of the hollow cylinder forming the second component region 33. The first component region 32 completely fills the interior of the second component region 33. As a result, the entire flow of exhaust gas is divided into a partial flow that flows through the first component region 32 and a partial flow that flows through the second component region 33.

The first end face 36 and the second end face 37 are in each case formed by the first component region 32 as well as by the second component region 33. At least 30%, in particular at least 50%, of the first end face 36 here is advantageously formed by the second component region 33. In an embodiment, it can also be provided that the first component region 32 has a length which is measured in the flow direction 40 and is smaller than the length c of the second component region 33. In this case, the first end face 36 and/or the second end face 37 can be formed completely by the second component region 33.

The throughflow body 31 can be produced in that the cylindrical first component region 32 is press-fitted into the hollow-cylindrical second component region 33. Alternatively, it can also be provided that the completed and coated first component region 32 is surrounded by a wire body which is uncoated or coated only with a washcoat and which forms the second component region 33. For example, the wire body that forms the second component region 33 can be wound around the first component region 32. The second component region 33 here can be configured with larger dimensions so that the second component region 33 protrudes beyond the first component region 32 and can thus form the first and/or the second end face 36, 37.

Figure 9:
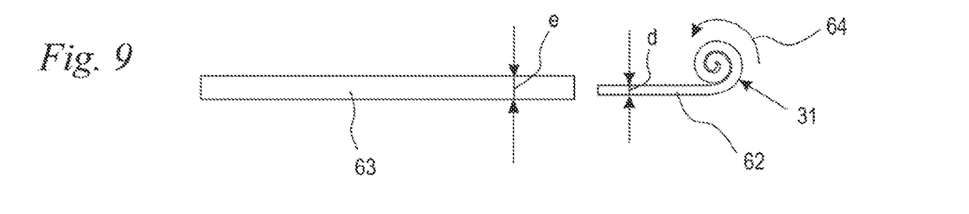
FIG. 9 shows a schematic illustration of a method for producing a throughflow body.
Figure 10:
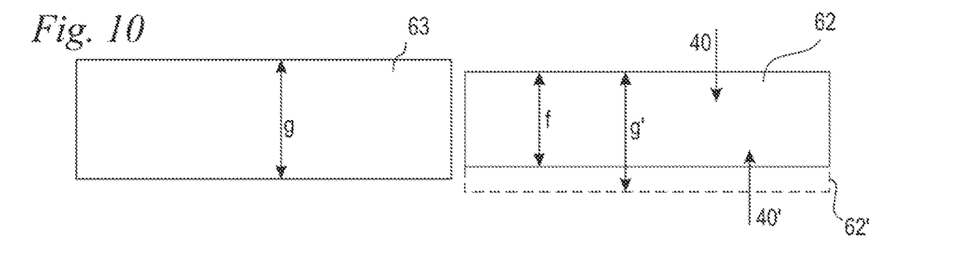
FIG. 10 shows a schematic illustration of mats from which the throughflow body can be produced.

In an alternative embodiment, the throughflow body 31 can be wound. This is schematically illustrated in FIGS. 9 and 10. The configuration of the throughflow body 31 as a wound body is particularly advantageous for a throughflow body 31 having an approximately cylindrical shape, for example for the throughflow body 31 illustrated in FIGS. 7 and 8.

The throughflow body 31 can be formed by at least one mat 62, 63 which is wound. The throughflow body 31 formed by winding is advantageously compression molded after being wound. FIG. 9 schematically shows the production of a throughflow body 31 from a first mat 62 and a second mat 63. The first mat 62 forms the first component region 32 of the throughflow body 31, and the second mat 63 forms the second component region 33 of the throughflow body 31. A plurality of first mats 62 and/or a plurality of second mats 63 may also be provided. The second mat 63 after winding advantageously surrounds the first mat 62 across the entire external circumference of the latter. Accordingly, the entire peripheral surface of the throughflow body 31 is advantageously formed by the second mat 63, thus by the second component region 33.

The mats 62 and 63 can have the same thickness. In the embodiment the mat 62 has a thickness d. The mat 63 has a thickness e. The thicknesses d and e are dissimilar in the embodiment. The thickness d in the embodiment is smaller than the thickness e. It can also be provided that the thickness d is greater than the thickness e.

The at least one first mat 62 has a catalytically functioning coating. Additionally, the at least one first mat 62 can have a washcoat below the catalytically functioning coating. The at least one second mat 63 does not have any catalytically functioning coating, or in terms of volume a smaller quantity of catalytically functioning coating than the at least one first mat 62. The catalytically functioning coating of the second mat 63 can preferably be less than 1 mg/cm$^3$. The at least one second mat 63 can have a washcoat or no coating for enlarging the surface.

Figure 11:
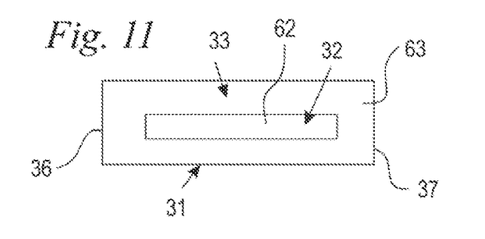
FIGS. 11 and 12 show schematic illustrations of throughflow bodies.

A first mat 62 and a second mat 63 in the non-wound state are illustrated in FIG. 10. The first mat 62 has a width f, and the second mat 63 has a width g. In the embodiment, the width g is larger than the width f. The widths f and g are measured parallel to the winding axis of the mats 62 and 63. In a completely wound throughflow body 31 the widths f and g are measured in the flow direction 40. The flow direction 40 is schematically plotted in FIG. 10. In an alternative variant of embodiment, a flow direction can also be provided in the opposite direction, as is schematically indicated by the arrow 40' in FIG. 10. In the embodiment the width f of the at least one first mat 62 is smaller than the width g of the at least one second mat 63. As a result, the at least one second mat 63 overlaps the at least one first mat 62 on at least one end face 36, 37 of the throughflow body 31. As a result, the at least one second mat 63 can form at least one end face 36 and/or 37 of the throughflow body 31, as is schematically illustrated in FIG. 11.

Figure 12:
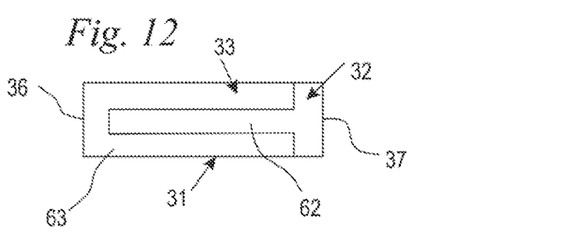

It can also be provided that the widths g and f are of identical size, and the mats 62 and 63 are wound so as to have an offset in the flow direction 40, thus parallel to the widths f and g. The disposal of such a mat 62' is illustrated by a dashed line in FIG. 10. The mat 62' has a width g' which corresponds to the width of the mat 63. The resultant throughflow body 31 is schematically illustrated in FIG. 12. In the variant of embodiment illustrated in FIG. 12, the second component region 33 forms the first end face 36, and the first component region 32 forms the second end face 37. In an alternative variant of embodiment, the throughflow body 31 illustrated in FIG. 12 can also be installed so as to be mirror-symmetrical to the illustration in FIG. 12. The first end face 36 and the second end face 37 in this variant of embodiment are swapped in relation to the illustration in FIG. 12. The first component region 32 in this instance forms the first end face 36, and the second component region 33 forms the second end face 37.

Alternatively, it can also be provided that both mats 62 and 63 have identical widths g and f and are wound without any offset such that both component regions 32 and 33, thus both mats 62 and 63, in the case of a completed throughflow body 31 protrude at both end faces 36 and 37, as is illustrated in the throughflow body 31 in FIG. 7.

In an embodiment, the first component region 32 and the second component region 33 are compact regions. The smallest area that completely encases the first component region 32 advantageously does not include any portions of the second component region 33. Alternatively, it can be provided that the component regions are disposed in an alternating manner in one or a plurality of cross sections, wherein each component region is intersected at least twice in at least one cross section. Exemplary embodiments of this type are shown in FIGS. 13 to 16 and in FIG. 23.

Figure 13:
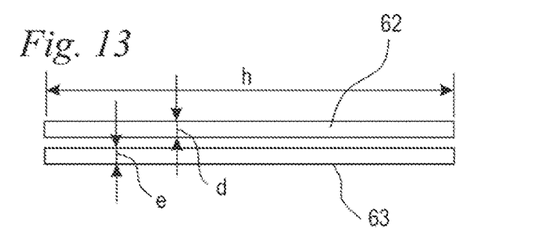
FIG. 13 shows a schematic illustration of mats from which a further embodiment of a throughflow body can be produced.
Figure 14:
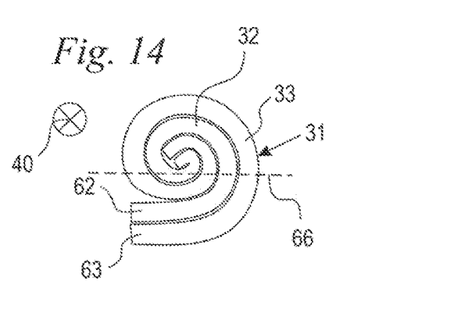
FIG. 14 shows a schematic illustration of a throughflow body produced from the mats from FIG. 13.

Provided in the embodiment as per FIG. 13 and FIG. 14 are two mats 62 and 63 which are placed on top of one another and subsequently conjointly wound. As is shown in FIG. 14, this results in a first component region 32 and a second component region 33 which in the direction perpendicular to the flow direction 40 form successive layers. The first component region 32 here is formed by the first mat 62, and the second component region 33 is formed by the second mat 63. The thickness of each layer corresponds to the thickness d or e, respectively, of the respective mat 62 or 63, respectively. The thicknesses d, e of the mats 62 and 63 are plotted in FIG. 13. The mats 62 and 63 in all exemplary embodiments here can have the same thickness d, e, as is also illustrated in FIG. 13. The thicknesses d and e may however also be dissimilar. The flow direction 40 in FIG. 14 is directed so as to be perpendicular to the sheet plane.

In the embodiment as per FIGS. 13 and 14, both mats 62 and 63 have the same length h. As described in the context of FIG. 10, the mats 62 and 63 can have the same width f, g or dissimilar widths f and g and/or be wound so as to have a mutual offset in the flow direction 40.

The dashed line 66 in FIG. 14 indicates the position of a potential cross section through the throughflow body 31. Three portions of the second component region 33 and two portions of the first component region 32 lie in this cross section. The portions of the component regions 32 and 33 alternate in this cross section. The component regions 32 and 33 are not configured so as to be compact but in this cross section are formed by successive layers.

Figure 15:
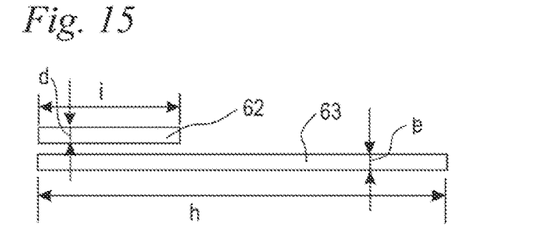
FIG. 15 shows a schematic illustration of mats from which a further embodiment of a throughflow body can be produced.
Figure 16:
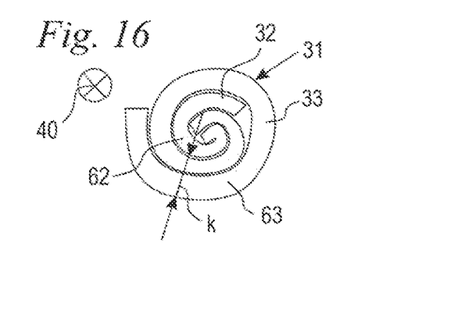
FIG. 16 shows a schematic illustration of a throughflow body produced from the mats from FIG. 15.

FIGS. 15 and 16 show an embodiment having a first mat 62 which has a length i, and having a second mat 63 which has a length h. The length i here is smaller than the length h. The lengths h and i are advantageously mutually adapted such that at least two tiers of the second mat 63 lie on top of one another at least across one component region of the circumference of the throughflow body 31. As a result, a larger thickness k of a layer of the second component region 33 measured perpendicularly to the flow direction 40 can be established in a simple manner on the external circumference of the throughflow body 31. One layer of the second component region 33 can be readily formed by a plurality of tiers of the second mat 63.

The first mat 62 has a thickness d, and the second mat 63 has a thickness e. The thicknesses d and e can be of an identical size. In an advantageous alternative variant of embodiment the thicknesses d and e are of dissimilar sizes.

The mats 62 and 63 can have dissimilar widths f, g and/or be disposed having a mutual offset in the flow direction 40 also in the embodiment as per FIGS. 15 and 16.

The illustrations in FIGS. 14 and 16 here are only schematic. In fact, a significantly larger number of tiers of the mats 62 and 63 can be provided.

Figure 17:
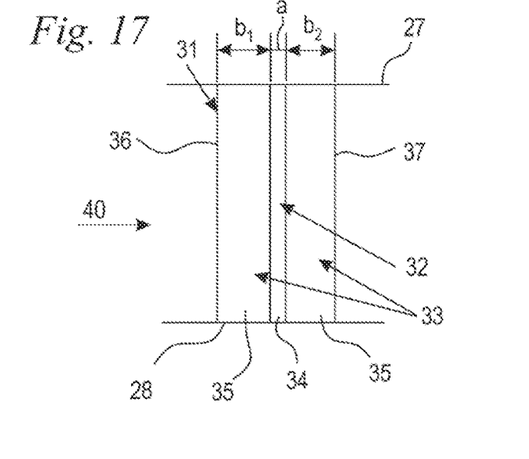
FIGS. 17 to 19 show schematic sectional illustrations through alternative embodiments of throughflow bodies in a catalytic converter housing.

FIG. 17 shows a further embodiment of a throughflow body 31 which is formed by one first wire body 34 and two second wire bodies 35. Both wire bodies 34, 35 have the same cross section. Both wire bodies 34, 35 in each cross section perpendicular to the flow direction 40 extend across the entire cross section of the throughflow body 31. The peripheral surface 38 is formed by the two second wire bodies 35 as well as by the first wire body 34. The peripheral surface 38 to a degree of at least 50%, in particular to a degree of at least 80%, is advantageously formed by the second wire bodies 35. The first end face 36 is formed completely by a second wire body 35. This wire body 35 in the flow direction 40 possesses a thickness $b_1$. This second wire body 35 in the flow direction is followed by a first wire body 34 having a thickness a measured in the flow direction 40. The first wire body 34 in the flow direction 40 is followed by a further wire body 35 having a thickness $b_2$ measured in the flow direction 40. The thickness a of the first wire body 34 can preferably be significantly smaller than the thicknesses $b_1$ and $b_2$. The thickness a of the first wire body 34 is advantageously at most 30%, in particular at most 20%, preferably at most 10%, of the sum of the thicknesses $b_1$ and $b_2$ of the second component region 33.

Figure 18:
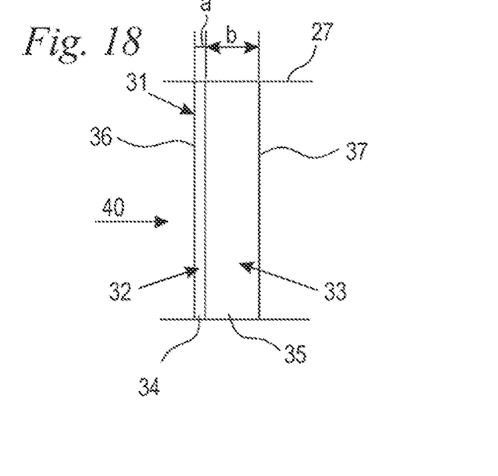

FIG. 18 shows a further embodiment of a throughflow body 31 which is formed from a single first wire body 34 and a single second wire body 35. The first wire body 34 is disposed upstream and completely forms the first end face 36. The second wire body 35 is disposed downstream and completely forms the second end face 37. The wire bodies 34 and 35 extend in each case across the entire cross section of the throughflow body 31 viewed perpendicularly to the flow direction 40. The greatest thickness a is significantly smaller than the greatest thickness b. The greatest thickness a is advantageously at most 30%, in particular at most 20%, preferably at most 10%, of the greatest thickness b of the second component region 33.

Both wire bodies 34 and 35 each have a consistent thickness a, b. Both wire bodies 34 and 35 in each case form part of the peripheral surface 38. At least 50%, in particular at least 80%, of the peripheral surface 38 is advantageously formed by the second wire body 35.

Figure 19:
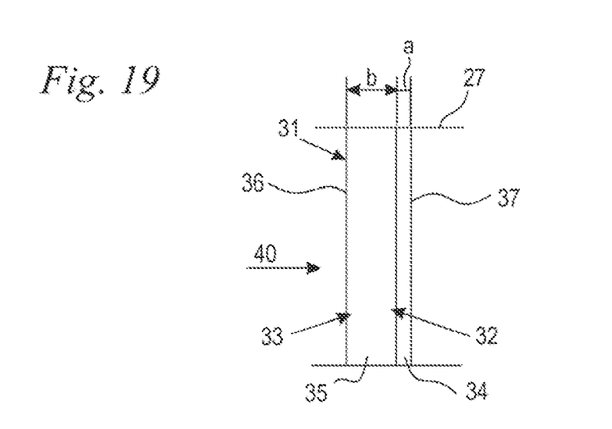

FIG. 19 shows a variant of embodiment of a throughflow body 31, the construction of the latter corresponding to that of the throughflow body 31 illustrated in FIG. 18. However, the throughflow body 31 in FIG. 19 is disposed in the exhaust muffler 23 such that the second wire body 35 in terms of the flow direction 40 is disposed upstream of the first wire body 34. The second wire body 35 completely forms the first end face 36. The first wire body 34 completely forms the second end face 37.

Figure 20:
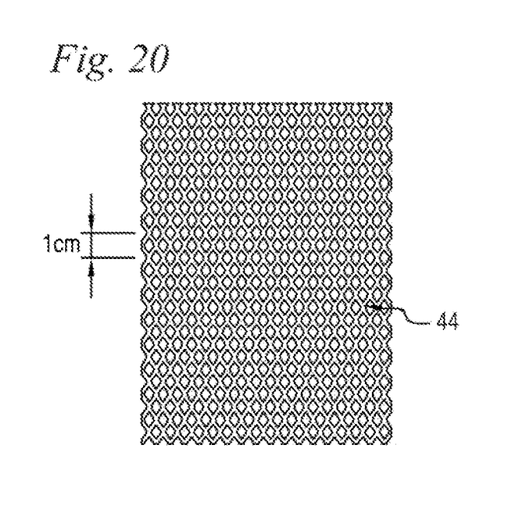
FIGS. 20 and 21 show illustrations of potential embodiments of individual bodies of the throughflow body.
Figure 21:
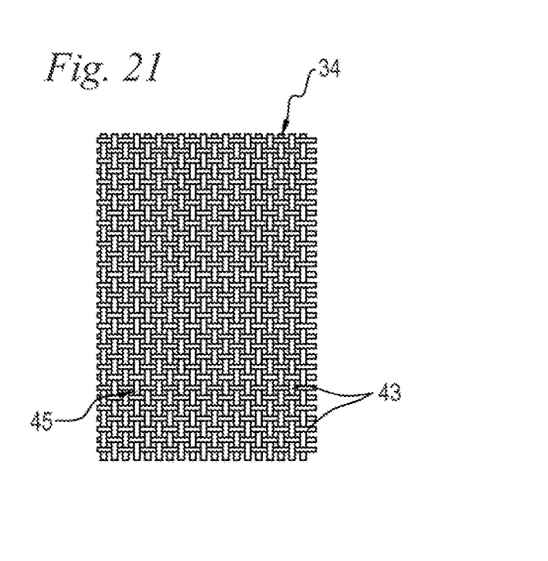
Figure 22:
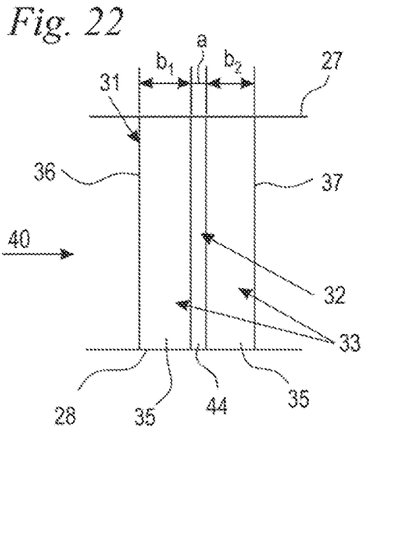
FIG. 22 shows a schematic sectional illustration through a further alternative embodiment of a throughflow body in a catalytic converter housing.

FIGS. 20 and 21 show embodiments for first individual bodies which have a catalytically functioning coating. A metal lattice 44 which, for example, can be provided instead of a first wire body 34 in one of the throughflow bodies 31 illustrated in FIG. 17, 18 or 19 is shown as a dimensionally stable individual body in FIG. 20. The use of a metal lattice 44 instead of a first wire body 34 is shown in an exemplary manner in FIG. 22 for the throughflow body 31 shown in FIG. 17. In FIGS. 18 and 19, the first wire body 34 can be replaced in an analogous manner by a metal lattice 44.

Figure 23:
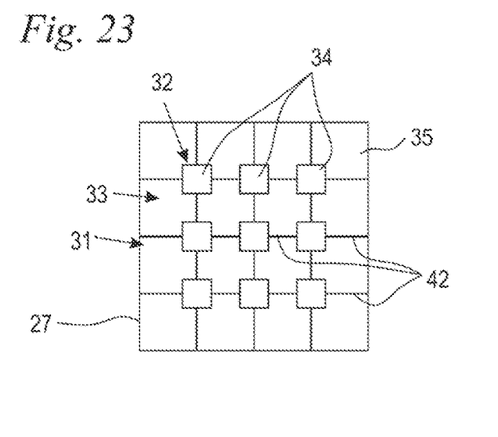
FIG. 23 shows a schematic illustration of a further embodiment of a throughflow body; and, FIG. 24 shows a schematic sectional illustration of a mixture-lubricated four-stroke engine.

FIG. 21 shows a first wire body 34 which is configured as a metal mesh 45. The metal mesh 45 is produced from individual metal wires 43 which form the warp threads and weft threads. A potential scale is also indicated in each of FIGS. 20 and 21. FIG. 23 shows a further embodiment for a throughflow body 31. The throughflow body 31 is formed by a multiplicity of first wire bodies 34 which form the first component region 32 and are provided with a catalytically functioning coating. The first wire bodies 34 are mutually separated by regions of the second component region 33. The regions of the second component region 33 can be configured separately from one another and formed by a plurality of second wire bodies 35. Alternatively, the regions of the second component region 33 can be formed by a single second wire body 35 which has corresponding clearances. The individual first wire bodies 34 are connected to one another and/or to the second component region 33 by way of heat conducting elements 42. The heat conducting elements 42 have a higher thermal conductivity than the first wire bodies 34. The heat conducting elements 42 can be composed of a material which has a higher thermal conductivity that the material of the first wire bodies 34, for example. Alternatively, the heat conducting elements 42 can have a larger cross section than the wire of the first wire bodies 34, for example. The heat conducting elements 42 advantageously establish a direct and straight connection between adjacent first wire bodies 34. Heat created in the first wire body 34 is dissipated to the second wire body or bodies 35 by way of the heat conducting elements 42. More rapid heating of the second component region 33 is achieved as a result.

The throughflow body 31 is disposed in the catalytic converter housing 27. The first wire bodies 34 are advantageously connected to the housing 27 by way of heat conducting elements 42. As a result, the heat created by the first wire bodies 34 can at least be partially dissipated into the catalytic converter housing 27, and excessive heating of the first wire bodies 34 is avoided.

Figure 24:
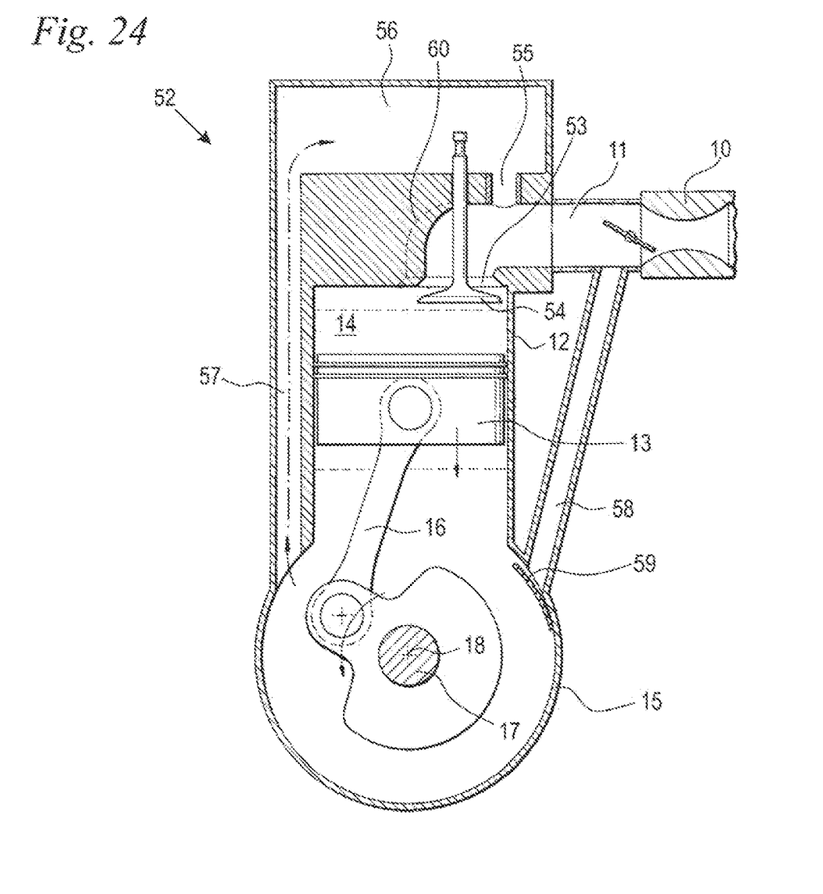

It is provided in FIG. 1 that the exhaust muffler 23 is disposed on a two-stroke engine 8. Alternatively, the exhaust muffler 23 can also be disposed on a four-stroke engine, in particular on a mixture-lubricated four-stroke engine. Such a mixture-lubricated four-stroke engine 52 is schematically illustrated in FIG. 24. The same reference signs here identify the same elements as in the two-stroke engine 8.

The four-stroke engine 52 has the combustion chamber 14 which is configured in the cylinder 12 and is delimited by the piston 13. The crankshaft 17 which by the piston 13 is driven so as to rotate about the rotational axis 18 is disposed in the crankcase 15. The intake channel 11 opens into the combustion chamber 14 at a controllable inlet opening 53. An inlet valve 54 which can be actuated for example by way of a control cam or a rocker, in particular as a function of the rotary position of the crankshaft 17, is disposed at the inlet opening 53. A schematically illustrated outlet channel 60, which is likewise controlled by a valve not illustrated, leads out of the combustion chamber 14. The outlet channel 60 opens out at the exhaust inlet 24 of the exhaust muffler 23 (FIG. 1). The intake channel 11 is connected to a valve control chamber 56 by way of a connection opening 55. The valve control chamber 56 is connected to the interior of the crankcase 15 by way of a first connecting channel 57. Provided in the embodiment is a further, second connecting channel 58 which connects the intake channel 11 to the interior of the crankcase 15 by way of a check valve 59. A fuel/air mixture from the intake channel 11 is transported by way of the connecting channels 57 and 58 into the interior of the crankcase 15 by virtue of the pulses created in the interior of the crankcase 15 during operation, the fuel/air mixture lubricating the moving parts in the crankcase 15. As a result, oil which in part can make its way without combustion through the outlet channel 60 into the exhaust muffler 23 must be contained in the fuel.

In all the variants of the embodiments, the second component region 33 can have no coating, a washcoat or a washcoat and a catalytically functioning coating. The quantity of catalytically functioning coating of the second component region 33 can accordingly be zero or more than zero. The quantity of catalytically functioning coating of the second component region 33 in terms of the volume is smaller than the quantity of catalytically functioning coating of the first component region 32.

In all exemplary embodiments the volume of the first component region 32 is advantageously 5% to 90%, in particular 5% to 80%, preferably 10% to 20%, of the total volume of the throughflow body 31. The volume of the first component region 32 is particularly advantageously at most 50%, in particular at most 30%, of the total volume of the throughflow body 31. The volume of the second component region 33 is advantageously 10% to 95%, in particular 20% to 95%, preferably 80% to 90%, of the total volume of the throughflow body 31. The volume of the second component region 33 is particularly advantageously at least 50%, in particular at least 70%, of the total volume of the throughflow body 31.

The embodiments illustrated can be combined with one another in an arbitrary manner so as to form further variants of the embodiments according to the disclosure. The catalytic converter housing 27 for all exemplary embodiments can be configured in a manner corresponding to that described in the context of the first embodiment. In all variants of the embodiments, one wire body or a plurality of wire bodies can be formed by metal meshes or compression molded metal wire. In all exemplary embodiments, one individual body or a plurality of individual bodies can be formed by a metal lattice or a metal body of another structure. It can be provided that the throughflow body 31 is constructed exclusively from wire bodies. Alternatively, it can also be provided that the throughflow body 31, besides one or a plurality of wire bodies, has further individual bodies, in particular of metal, which are not formed from wire. The throughflow body 31 can preferably be constructed from a small number of individual, dimensionally stable individual bodies. The dimensionally stable individual bodies are advantageously press-fitted to one another and thus form a dimensionally stable throughflow body 31. The throughflow body 31 is advantageously formed by at most ten, in particular at most five, individual bodies. The throughflow body 31 particularly preferably has two to four individual bodies. Each individual body preferably forms only part of a single component region of the throughflow body 31. Accordingly, in the context of production accuracy, each individual body of the throughflow body 31 has a uniform catalytically functioning coating. The layer thickness of the catalytically functioning coating is uniform in the context of the production accuracy. Each individual body, in particular each wire body, of the throughflow body 31 is accordingly produced in a uniform manner. Each individual body of the throughflow body 31 is uniformly coated or not coated. This results in a simple production. In an embodiment, the throughflow body 31 is formed by a small number of dimensionally stable wire bodies.

In the exemplary embodiments the catalytic converter has an approximately rectangular shape or a cylindrical shape. However, another shape of the catalytic converter may also be advantageous. A spherical catalytic converter is in particular considered to be advantageous.

It is understood that the foregoing description is that of the preferred embodiments of the invention and that various changes and modifications may be made thereto without departing from the spirit and scope of the invention as defined in the appended claims.

What is claimed is:

1. An exhaust gas muffler comprising:
an exhaust gas inlet and an exhaust gas outlet;
a catalytic converter arranged in flow direction between said exhaust gas inlet and said exhaust gas outlet;
said catalytic converter including at least one throughflow body defined by at least one wire body;
said throughflow body having a first end face arranged upstream with respect to said flow direction through said throughflow body and further having a second end face arranged downstream with respect to said flow direction through said throughflow body;
said throughflow body having at least one first component region coated with a catalytically functioning coating of a first quantity;
said throughflow body further having a second component region having a catalytically functioning coating of a second quantity smaller than said first quantity with respect to volume; and,
wherein said second component region completely surrounds said first component region.

2. The exhaust muffler of claim 1, wherein the second component region does not have any catalytically functioning coating.

3. The exhaust muffler of claim 1, wherein said throughflow body is assembled from a plurality of dimensionally stable individual bodies; and, each one of said individual bodies, when viewed individually, has the same coating or no coating in all regions.

4. The exhaust muffler of claim 1, wherein at least 50% of said second end face is formed by said second component region.

5. The exhaust muffler of claim 1, wherein said second end face is formed completely by said second component region.

6. The exhaust muffler of claim 1, wherein said first component region, viewed in a cross section through said first component region perpendicular to said flow direction, extends across at least 30% of the area of said throughflow body.

7. The exhaust muffler of claim 1, wherein said first component region is formed by at least one first wire body; and, said second component region is formed by at least one second wire body.

8. The exhaust muffler of claim 7, wherein said second component region is formed by at least two second wire bodies; and, at least one of the second wire bodies has a depression for receiving said at least one first wire body.

9. The exhaust muffler of claim 1, wherein said throughflow body has a peripheral surface extending from said first end face to said second end face; and, said peripheral surface is formed to a degree of at least 50% by said second component region.

10. The exhaust muffler of claim 1, wherein said first component region and said second component region each, in at least one cross section, extend over the entire cross-sectional area of the exhaust muffler measured perpendicularly to said flow direction.

11. The exhaust muffler of claim 1, wherein each of said first and second component regions has a consistent thickness (a, b, $b_1$, $b_2$) measured in said flow direction.

12. The exhaust muffler of claim 1, wherein at least 50% of the first end face is formed by said second component region.

13. The exhaust muffler of claim 1, wherein said first end face is formed completely by said first component region.

14. The exhaust muffler of claim 1, wherein said second component region defines said second end face.

15. The exhaust muffler of claim 1, wherein said first component region has a greatest thickness (a) measured in said flow direction and said second component region has a greatest thickness (b, $b_1$, $b_2$) measured in said flow direction; and, said greatest thickness (a) of said first component region is at most 30% of said greatest thickness (b, $b_1$, $b_2$) of said second component region.

16. The exhaust muffler of claim 1, wherein at least one wire body is formed of compression molded metal wire.

17. The exhaust muffler of claim 1, wherein said throughflow body is configured of at least two individual bodies of dissimilar structures.

18. The exhaust muffler of claim 1, wherein said throughflow body is configured by at least two wire bodies of dissimilar structures.

19. The exhaust muffler of claim 1, wherein said throughflow body comprises at least one metal lattice.

20. The exhaust muffler of claim 19, wherein said metal lattice forms said first component region.

21. The exhaust muffler of claim 1, wherein said second component region has a catalytically functioning coating of less than 1 mg/cm$^3$.

22. The exhaust muffler of claim 1, wherein one of the following applies: a) said second component region is coated with a washcoat; and, b) said second component region is uncoated.

23. The exhaust muffler of claim 1, wherein said throughflow body is formed by at least one wound mat.

24. The exhaust muffler of claim 1, wherein said catalytic converter has a catalytic converter housing wherein said throughflow body is disposed.

25. The exhaust muffler of claim 24, wherein said throughflow body is press-fitted into said catalytic converter housing.

26. An exhaust gas muffler comprising:
an exhaust gas inlet and an exhaust gas outlet;
a catalytic converter arranged in flow direction between said exhaust gas inlet and said exhaust gas outlet;
said catalytic converter including at least one throughflow body defined by at least one wire body;
said throughflow body having a first end face arranged upstream with respect to said flow direction through said throughflow body and further having a second end face arranged downstream with respect to said flow direction through said throughflow body;
said throughflow body having at least one first component region coated with a catalytically functioning coating of a first quantity;
said throughflow body further having a second component region having a catalytically functioning coating of a second quantity smaller than said first quantity with respect to volume; and,
wherein said first component region comprises a plurality of portions configured so as to be mutually separate;
said second component region extends between said plurality of portions; and,
said first component region includes a plurality of first component regions connected to one another by at least one heat conducting element.

27. An exhaust gas muffler comprising:
an exhaust gas inlet and an exhaust gas outlet;
a catalytic converter arranged in flow direction between said exhaust gas inlet and said exhaust gas outlet;
said catalytic converter including at least one throughflow body defined by at least one wire body;
said throughflow body having a first end face arranged upstream with respect to said flow direction through said throughflow body and further having a second end face arranged downstream with respect to said flow direction through said throughflow body;
said throughflow body having at least one first component region coated with a catalytically functioning coating of a first quantity;
said throughflow body further having a second component region having a catalytically functioning coating of a second quantity smaller than said first quantity with respect to volume;
said throughflow body being formed by at least one wound mat; and,
wherein said first component region, in a direction transverse to said flow direction through said throughflow body, is at least partially surrounded by said second component region.

28. The exhaust muffler of claim 27, wherein said first component region is formed by at least one first mat and said second component region is formed by at least one second mat.

29. An exhaust gas muffler comprising:
an exhaust gas inlet and an exhaust gas outlet;
a catalytic converter arranged in flow direction between said exhaust gas inlet and said exhaust gas outlet;
said catalytic converter including at least one throughflow body defined by at least one wire body;
said throughflow body having a first end face arranged upstream with respect to said flow direction through said throughflow body and further having a second end face arranged downstream with respect to said flow direction through said throughflow body;
said throughflow body having at least one first component region coated with a catalytically functioning coating of a first quantity;
said throughflow body further having a second component region having a catalytically functioning coating of a second quantity smaller than said first quantity with respect to volume;
said throughflow body being formed by at least one wound mat;
said first component region being formed by at least one first mat and said second component region being formed by at least one second mat; and,
wherein said at least one first mat and said at least one second mat have dissimilar thicknesses (d, e).

30. The exhaust muffler of claim 29, wherein said at least one first mat and said at least one second mat have dissimilar widths (f, g) measured in said flow direction.

31. A two-stroke engine or mixture-lubricated four-stroke engine comprising:
an exhaust gas muffler;
said exhaust gas muffler including:
an exhaust gas inlet and an exhaust gas outlet;
a catalytic converter arranged in flow direction between said exhaust gas inlet and said exhaust gas outlet;
said catalytic converter including at least one throughflow body defined by at least one wire body;
said throughflow body having a first end face arranged upstream with respect to said flow direction through said throughflow body and further having a second end face arranged downstream with respect to said flow direction through said throughflow body;

said throughflow body having at least one first component region coated with a catalytically functioning coating of a first quantity;

said throughflow body further having a second component region having a catalytically functioning coating of a second quantity smaller than said first quantity with respect to volume; and, wherein said second component region completely surrounds said first component region.

32. A catalytic converter for an exhaust muffler, the catalytic converter comprising:

at least one throughflow body defined by at least one wire body;

said throughflow body having a first end face arranged upstream with respect to said flow direction through said throughflow body and further having a second end face arranged downstream with respect to said flow direction through said throughflow body;

said throughflow body having at least one first component region coated with a catalytically functioning coating of a first quantity; and, said throughflow body further having a second component region having a catalytically functioning coating of a second quantity smaller than said first quantity with respect to volume; and, wherein said second component region completely surrounds said first component region.

\* \* \* \* \*

UNITED STATES PATENT AND TRADEMARK OFFICE
CERTIFICATE OF CORRECTION

| | |
|---|---|
| PATENT NO. | : 11,813,569 B2 |
| APPLICATION NO. | : 17/707632 |
| DATED | : November 14, 2023 |
| INVENTOR(S) | : N. Kunert et al. |

It is certified that error appears in the above-identified patent and that said Letters Patent is hereby corrected as shown below:

On the Title Page

<u>Under (72) Inventors</u>:
After Johannes Alber, delete "Erdmannhausen" and substitute -- Stuttgart -- therefor.
After Marcus Bonifer, delete "Muehiheim" and substitute -- Muehlheim -- therefor.

In the Specification

<u>In Column 13</u>:
Line 34: delete "806%," and insert -- 80%, -- therefor.

Signed and Sealed this
Thirtieth Day of January, 2024

Katherine Kelly Vidal
*Director of the United States Patent and Trademark Office*